(12) United States Patent
Auh et al.

(10) Patent No.: US 11,360,452 B2
(45) Date of Patent: Jun. 14, 2022

(54) SYSTEM AND METHOD FOR GENERATING A MOTOR CONTROL CENTER LINEUP BASED ON A LOAD LIST

(71) Applicant: Rockwell Automation Technologies, Inc., Mayfield Heights, OH (US)

(72) Inventors: Yong Y. Auh, Racine, WI (US); Richard E. Wandsnider, Cedarburg, WI (US); Joel L. Wille, Milwaukee, WI (US); Steven L. Fischer, Mequon, WI (US); John P. Mason, Milwaukee, WI (US); Gerald W. Renderman, West Bend, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 52 days.

(21) Appl. No.: 16/871,992

(22) Filed: May 11, 2020

(65) Prior Publication Data
US 2021/0149360 A1    May 20, 2021

Related U.S. Application Data

(60) Provisional application No. 62/937,036, filed on Nov. 18, 2019, provisional application No. 62/937,093, filed on Nov. 18, 2019.

(51) Int. Cl.
*G05B 19/418* (2006.01)
*G06F 9/38* (2018.01)
*G05B 19/042* (2006.01)

(52) U.S. Cl.
CPC ..... *G05B 19/0426* (2013.01); *G05B 19/4185* (2013.01); *G05B 2219/23067* (2013.01); *G05B 2219/23258* (2013.01); *G05B 2219/31449* (2013.01)

(58) Field of Classification Search
CPC ............ G05B 19/0426; G05B 19/4185; G05B 2219/23067; G05B 2219/23258; G05B 2219/31449; G06Q 10/00
See application file for complete search history.

(56) References Cited

U.S. PATENT DOCUMENTS

| | | | |
|---|---|---|---|
| 8,155,943 B2 | 4/2012 | Nasle | |
| 8,229,722 B2 | 7/2012 | Nasle | |
| 8,775,934 B2 | 7/2014 | Nasle et al. | |
| 10,275,265 B1 | 4/2019 | Gould et al. | |
| 2008/0097800 A1 | 4/2008 | Kutlev et al. | |
| 2011/0246108 A1* | 10/2011 | Runkle | G05B 23/0272 702/64 |

(Continued)

OTHER PUBLICATIONS

European Search Report; Application No. 20205171.0-1222; dated Dec. 15, 2020; 7 pages.

*Primary Examiner* — Charles R Kasenge
(74) *Attorney, Agent, or Firm* — Fletcher Yoder, P.C.

(57) ABSTRACT

A computing system has a processor that receives client data defining one or more electrical loads of an industrial automation project. The computing system generates one or more motor control lineups based on the client data and historical data associated with a plurality of previous industrial automation projects. The computing system receives a selection of a motor control lineup form a plurality of motor control lineups. A visual representation of the selected motor control lineup is generated and transmitted for display on a graphical user interface.

20 Claims, 7 Drawing Sheets

(56) References Cited

U.S. PATENT DOCUMENTS

| | | | |
|---|---|---|---|
| 2012/0253718 A1* | 10/2012 | Runkle | G05B 23/0272 |
| | | | 702/64 |
| 2013/0346031 A1* | 12/2013 | Shaw | H02J 13/00034 |
| | | | 703/1 |
| 2016/0003920 A1* | 1/2016 | McQuillan | G06F 30/367 |
| | | | 702/60 |
| 2016/0146867 A1* | 5/2016 | Schuh | G01R 19/0092 |
| | | | 702/182 |
| 2018/0173180 A1* | 6/2018 | Frampton | G05B 19/042 |
| 2020/0218216 A1* | 7/2020 | Frampton | F04B 39/121 |

* cited by examiner

| Location* | Industry* | | | | | | | | |
|---|---|---|---|---|---|---|---|---|---|
| Electrical Power | | | | | | | | | |
| Line Voltage | Frequency | | | | | | | | |
| 460 VAC | 50Hz | | | | | | | | |
| Enclosure Type | Simultaneous Load | | | | | | | | |
| IP42 | 50% | | | | | | | | |
| Control Voltage | Future Expansion | | | | | | | | |
| 220-240 VAC E | 10% | | | | | | | | |
| Horizontal Bus | Estimated Bus Size: | | | | | | | | |
| 800A | 475 Amps | | | | | | | | |

Load List

| Item No. | Power (kw) | Full Load Amps | Application | Motor Name |
|---|---|---|---|---|
| 1 | 2.2 | | Fan | East Venting |
| 2 | 2.2 | | Fan | West Venting |
| 3 | 37 | | Pump | PW Loop T |
| 4 | 22 | | Pump | Process WW Collection |
| 5 | 5.5 | | Pump | GMO WW Collection |
| 6 | 5.5 | | Pump | NAOH 36% Storage |
| 7 | 22 | | Pump | PW Loop V |
| 8 | 4 | | Pump | PW Loop X |
| 9 | 7.5 | | Pump | PW Loop Y |
| 10 | 160 | | Fan | North Venting |

View Suggested Configurations

*FIG. 3*

| Location* | Industry* |
|---|---|
| Electrical Power | |
| Line Voltage | Frequency |
| 460 VAC | 50Hz |
| Enclosure Type | Simultaneous Load |
| IP42 | 50% |
| Control Voltage | Future Expansion |
| 220-240 VAC E | 10% |
| Horizontal Bus | Estimated Bus Size: |
| 800A | 475 Amps |

Recommendation — 7 ☀ 4
- ✓ Power Monitor
- ✗ Intelligent Software
- ✗ Network Provided
- ✗ HIM Basic Control Station
- ✓ Arcshield
- ✓ Insulated Bus
- ✗ Safety Rating
- ✗ FOS 4B5

Estimated Cost: $43,000.00 [Select]

Increase Intelligence — 7 ☀ 5
- ✓ Power Monitor
- ✓ Intelligent Software
- ✗ Network Provided
- ✗ HIM Basic Control Station
- ✓ Arcshield
- ✓ Insulated Bus
- ✗ Safety Rating
- ✗ FOS 4B5

Estimated Cost: $51,600.00 [Select]

Increase Safety — 8 ☀ 4
- ✓ Power Monitor
- ✗ Intelligent Software
- ✗ Network Provided
- ✓ HIM Basic Control Station
- ✓ Arcshield
- ✓ Insulated Bus
- ✓ Safety Rating
- ✗ FOS 4B5

Estimated Cost: $55,900.00 [Select]

*FIG. 4*

SYSTEM AND METHOD FOR GENERATING A MOTOR CONTROL CENTER LINEUP BASED ON A LOAD LIST

CROSS REFERENCE TO RELATED APPLICATIONS

This application claims benefit of U.S. Provisional Patent Application No. 62/937,036 and U.S. Provisional Application No. 62/937,093, each filed on Nov. 18, 2019, and each herein incorporated by reference in its entirety.

BACKGROUND

The present disclosure is generally directed to techniques for generating a motor control lineup, which could include a motor control center or a number of inverters (e.g., drives) supplied from a common bus for an industrial automation system. More specifically, the present disclosure relates to techniques for generating recommendations for a motor control lineup based on customer requirements and preferences.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial systems may include various types of industrial device assemblies, such as motor control centers (MCCs), switchgear assemblies, and the like. Such industrial device assemblies are typically custom ordered from a manufacturer for a particular industrial site. Before submitting a purchase order for a particular industrial device assembly, including design of a layout of a corresponding motor control center, the customer may define specifications of the industrial device assembly and submit the specifications of the industrial device assembly through an approval cycle.

Conventionally, a single-line diagram is manually generated by a user using a computer-aided design (CAD) program or some other suitable tool. That is, the user may receive customer data related to an electrical power system and related industrial devices, such as an electrical load list, and generate a single-line diagram representative of the electrical power system. Upon completion, the single-line diagram may be rendered on a display in an application executing on a computer for viewing and review.

If the customer specifications, preferences, and/or customer data are changed during or after design of the industrial device assembly or a corresponding single-line diagram, the industrial device assembly or single-line diagram may require a re-design to meet the updated specifications, preferences, and/or customer data.

The process of designing and re-designing the industrial device assembly and/or single-line diagram can be arduous and time-consuming and may often contribute to long delays on a particular project at an industrial site. For example, the industrial device assembly may be subdivided into lineups, sections, units, or the like. Each lineup may have 1-N sections and each section may have 1-M units, which respectively contain at least one industrial automation device. Each lineup, section, or unit may need to be re-designed to meet the updated customer specifications which can lead to a significant delay at the industrial site.

Furthermore, before the industrial device assembly can be designed, updated customer data may need to be obtained. Thus, a customer may be queried multiple times to obtain the updated data. This may lead to further delays in the design process and may involve requesting data from the customer that is analyzed but not ultimately used.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment described herein provides a method for generating a motor control center lineup. The method generally includes receiving client data associated with a first industrial automation project, wherein the client data defines one or more characteristics of a design of the first industrial automation project. The method also includes parsing historical data associated with a plurality of previous industrial automation projects. The method also includes identifying at least one previous industrial automation project of the plurality of previous industrial automation projects that corresponds to the first industrial automation project based on a comparison of the client data and the historical data associated with the plurality of previous industrial automation projects. The method also includes generating a motor control center lineup based on the client data and the at least one previous industrial automation project that corresponds to the first industrial automation project. The method also includes generating a visual representation of the motor control center lineup. The method also includes transmitting the visual representation for display via a graphical user interface (GUI). The method also includes receiving, via the GUI, one or more inputs modifying the motor control center lineup. The method also includes modifying the motor control center lineup and the visual representation based on the one or more inputs.

Another embodiment described herein provides a system for generating a motor control center lineup. The system includes a processor and a memory storing instructions that, when executed by the processor, cause the processor to perform operations. The operations include receiving client data from a first client defining one or more electrical loads of an industrial automation project. The operations also include parsing historical data associated with a plurality of previous industrial automation projects for a plurality of additional clients. The operations also include identifying at least one additional client of the plurality of additional clients having one or more similarities to the first client based on the client data and the historical data. The operations also include generating a plurality of motor control center lineups based on the one or more similarities between the first client and the at least one additional client. The operations also include transmitting a summary of the plurality of motor control center lineups for display via a graphical user interface (GUI). The operations also include receiving, via the GUI, a selection of a first motor control center lineup of the plurality of motor control center lineups. The operations also include generating a visual representation of the selected motor control center lineup including a graphical object corresponding to each of the one or more electrical loads. The operations also include transmitting the visual representation of the selected motor control center lineup for display on the GUI.

Still another embodiment disclosed herein provides a non-transitory computer readable medium storing instructions that, when executed by a processor, cause the processor to perform operations. The operations include receiving client data from a first client related to one or more electrical loads of a first industrial automation project, wherein the client data comprises a location and an industry of the first industrial automation project. The operations also include parsing historical data associated with a plurality of previous industrial automation projects. The operations also include identifying at least one previous industrial automation project of the plurality of previous industrial automation projects that corresponds to the first industrial automation project based on the client data and the historical data associated with the plurality of previous industrial automation projects. The operations also include generating a motor control center lineup based on the client data and the at least one previous industrial automation project that corresponds to the first industrial automation project. The operations also include generating a visual representation of the motor control center lineup including a graphical object corresponding to each of the one or more electrical loads. The operations also include transmitting the visual representation of the motor control center lineup for display via a graphical user interface (GUI).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of the disclosure may be better understood upon reading the following detailed description with reference to the drawings described below.

FIG. 3 illustrates a graphical user interface for receiving client data related to the motor control lineup of FIG. 2, according to one embodiment.

FIG. 4 illustrates a graphical user interface for selecting features of the motor control lineup of FIG. 3, according to one embodiment.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

An electrical load list (e.g., motor load list) provides electrical parameters for various electrical equipment of an electrical power system (e.g., an industrial automation system), including generators, switchgear, and electrical transformers. A motor control lineup is an assembly of control devices for one or more motors of the electrical power system that provide actuation and automation for a system. The motor control lineup may include a motor control center (MCC) or inverters (e.g., drives) coupled to a common bus. The motor control lineup may include motor starters, fuses or circuit breakers, and/or a power disconnect. A motor control lineup, which defines the control devices therein and a layout for the control devices, may be generated based on the load list, data related to the desired industry, operations, and the like.

The data used to generate the motor control lineup may be received from a customer via one or more questionnaires that include numerous questions relating to specific preferences of, and desired layouts of, the electrical system and the motor control lineup. However, the process of generating the lineup and layout may be time consuming and may involve requesting data from the organization that is analyzed but not ultimately used. The embodiments herein provide techniques to streamline the process for generating the motor control lineup and layout and a corresponding single-line diagram.

Figure 1:
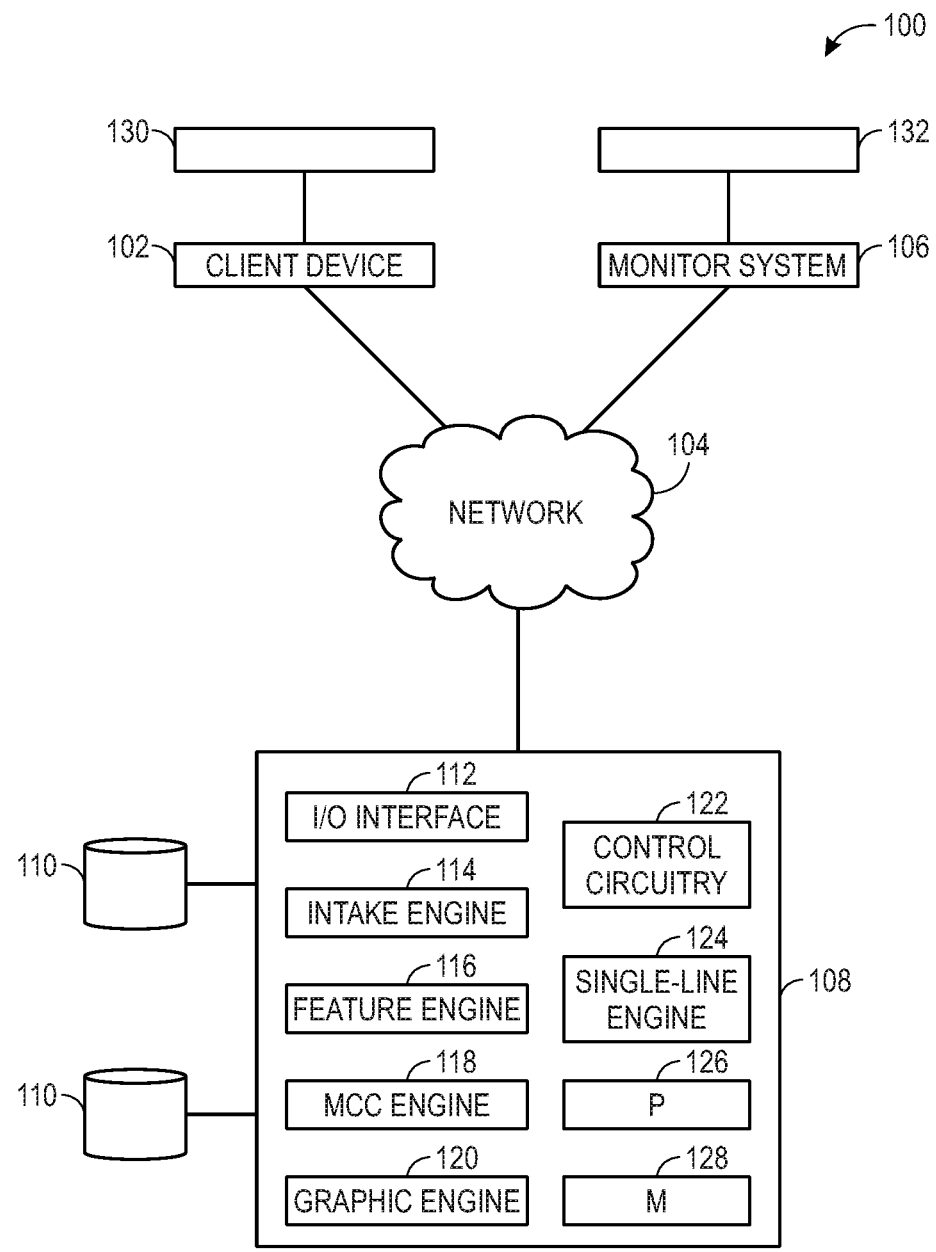
FIG. 1 illustrates a block diagram of a system for generating a motor control lineup and corresponding single-line diagram, according to an embodiment.

FIG. 1 illustrates a block diagram of a system 100 for generating a motor control lineup and a corresponding single-line diagram based on received inputs, according to an embodiment. The system 100 includes a client device 102, a monitor system 106, and a computing system 108, each connected to a network 104, for example, a wired local area network (LAN), a wireless local area network (WLAN), personal area network (PAN), wide area network (WAN), enterprise private network (EPN), the internet, etc.

The client device 102 may be a personal computer, such as a desktop computer, a portable computer, such as a laptop or notebook computer, or a smart device, such as a tablet, smart phone, human-machine interface (HMI), or the like. In the present embodiment, the client device 102 is used by a customer to input data related to an electrical power system, including electrical equipment, customer preferences, and so forth. Further, the client device 102 may also be used to control and/or modify operations of the electrical power system. The client device 102 transmits the input data to the computing system 108 via the network 104. The input data may include an electrical load list, a geographic location of the customer or the industrial site where the electrical power system will be installed, an industry of the customer or the electrical power system, and customer preferences related to, for example, safety and automation.

Examples of the industry input by the customer include "food and beverage," "oil and gas," "automotive," "marine," "chemicals," "cement," "metals," and the like. Examples of geographic locations provided by the customer include a hemisphere, a continent, a country, a state or province, a region within a country, and the like. The geographic location and industry associated with the customer may be obtained from a database, such as the database 110, which includes a user profile for each of a plurality of organizations.

The user profile for a given organization may include the geographic location associated with the organization, one or more industries in which the organization operates, historical data related to motor control lineups previously purchased by the organization, and other related data, such as preferences for a layout of a motor control lineup. The historical data may include, for example, safety features, such as arc containment enclosures previously purchased by the customer. The historical data may also include particular layouts of motor control lineups previously purchased by the customer or other organizations.

The monitor system 106 may monitor input data provided by one or more additional organizations that have currently or previously submitted data to the computing system 108. For example, the monitor system 106 may monitor data related to a plurality of one or more existing electrical systems 132 that were designed using the computing system 108 or a similar device. The monitor system 106 may also monitor data related to one or more existing electrical systems that were not designed using the computing system 108 but that corresponding input data was received by the monitoring system or is stored in one or more databases 110. That is, some of the input data may be retrieved from one or more databases 110 where data for a plurality of organizations is stored.

The computing system 108 includes an input/output (I/O) interface 112, an intake engine 114, a feature engine 116, a motor control engine 118 (e.g., an MCC engine), a graphic engine 120, control circuitry 122, and a single-line engine 124. The computing system 108 also includes one or more processors 126 and one or more memory devices 128. In some embodiments, each engine 114, 116, 118, 120, 122, 124 may have its own processor 126 and/or memory device 128. In other embodiments, the engines 114, 116, 118, 120, 124 may share one or more processors 126 and/or one or more memory devices 128. The one or more memory devices 128 may include long-term and/or short-term storage and may be used for storing data and/or program instructions (e.g., machine readable code, algorithms, etc.). The one or more processors 126 may be used to execute the program instructions stored on the one or more memory devices 128. Further, the one or more processors 126 may be configured to retrieve data from the one or more memory devices 128 and to store data (data generated from executing the program instructions, or data received from other data sources) on the one or more memory devices 128.

The control circuitry 122 may be connected to one or more components of the computing system 108 (e.g., via a bus) and control operation of the components of the computing system 108. For example, the control circuitry 122 may identify when input data is received from the client device 102 and initiate an analysis of the input data by the intake engine 114.

The I/O interface 112 may be connected to the network to receive and transmit data, such as the input data. The intake engine 114 receives the input data from the I/O interface 112 and stores the input data in the databases 110. The intake engine 114 analyzes the input data and determines whether additional information should be requested from the customer. For example, the intake engine 114 may determine whether a location or industry has been provided by the customer. If not, the intake engine 114 may generate a request for this information to be sent to the customer.

A request for additional information may also be generated by the intake engine 114 based on the input data. For example, if the input data includes a load list, information specific to a particular load or corresponding motor, such as a voltage or current rating, may be requested form the user. The intake engine 114 may also receive input data from the monitor system 106 and store the data in one or more databases 110.

In some embodiments, load devices in the electrical load list may be used by the intake engine 114 to query existing designs of motor control lineups stored in the database 110 to determine suitable designs for the recommended motor control lineup. In this way, the load devices may dictate how the computing system 108 identifies suitable motor control lineup designs and the like.

The input data from the customer and the data in the database 110 may be in various formats. Thus, the intake engine 114 may include a programmatic interface that interprets and converts the data into a format which can be used in determining the recommended motor control lineup.

The feature engine 116 analyzes the input data from the customer (e.g., via the client device 102) and identifies features to be included in a recommended motor control lineup based on the input data. For example, the feature engine may identify an industry of the customer or corresponding industrial automation project 130. Based on the industry, the feature engine 116 may analyze the input data from the one or more additional organizations stored in the database(s) 110 to identify common features purchased by other organizations in the same or similar industry. The identified common features may be evaluated for possible inclusion in the recommended motor control lineup.

Similarly, organizations in the same or similar industry have similar preferences to satisfy local and/or national laws and/or guidelines. Thus, the feature engine 116 may also analyze the input data from the additional organizations, or previous input data from the same organization, to identify parameters used in previous motor control lineup designs. Based on the parameters, the feature engine 116 may identify particular features of the motor control lineup that are common to the customer, industry, and/or location of the industrial automation project 130. For example, if the industry input by the customer is "commercial bottling," the feature engine may identify motor control lineup features that are commonly requested or purchased by additional organizations in the "commercial bottling" industry based on the data in the database(s) 110 related to the additional organizations.

Further, the geographic location of the customer or the industrial automation project site may indicate certain parameters of the organization. The geographic location may be indicative a utility operating voltage, emissions standards, requirements of the electrical system to comply with local laws and/or guidelines, etc. For example, an industrial operating voltage (e.g., 110V or 240V), a control voltage (e.g., 12V or 24V) of the motor control lineup and the like. Similarly, the feature engine 116 may analyze data related to other organizations in a geographic location or region similar to that of the customer or the industrial automation project site. Thus, the feature engine 116 analyzes the data from previous motor control lineup designs for each organization that is similar to the requesting customer to determine particular features of the motor control lineup that may be common or similar to, for example, the industry and geographic location of the requesting customer.

The feature engine 116 may also identify particular features that are specifically requested by the customer or satisfy one or more specifications of the customer, including safety features and/or automation features. For example, in the input data, the customer may specifically request arc containment. In such an embodiment, the feature engine 116 identifies the specified feature (i.e., arc containment) and includes that feature in the motor control lineup. In some cases, the feature engine 116 may determine that additional input is needed from the customer, such as specific safety features to be included in the motor control lineup. Example safety features may include arc containment and withdrawable units. In some embodiments, the feature engine 116 may request the additional input from the customer.

In some embodiments, the feature engine 116 may include a machine learning model (not shown), which may be trained using historical data. For example, the machine learning model may include historical customer data from various industries and geographic locations. The machine learning model may be updated each time a motor control lineup recommendation is determined, or on some other schedule (after a set period of time has passed, after a set number of motor control lineup recommendations have been generated, etc.). The updated machine learning model may be used by the feature engine 116 so that subsequent motor control lineup recommendations take the most recent customer data into account.

In some embodiments, the machine learning model may also analyze how various users interact with the recommended motor control lineup. For example, the recommended motor control lineup may be presented to a user via a web browser executing on the client device 102. The machine learning model may monitor how the customer interacts with the recommendation in the web browser to analyze any changes or selections that are made and use these inputs as feedback for further training of the machine learning model. Monitoring and adding these interactions to the machine learning model may enable the machine learning model to continually improve its ability to provide recommendations to users and to other organizations that share certain similarities with the respective organization.

The MCC engine 118 receives the features to be included in the motor control lineup from the feature engine 116. The MCC engine 118 identifies particular control devices (e.g., power disconnects, breakers or fuses, motor starters, interlock switches, etc.) and corresponding parameters (e.g., arc containment, withdrawable units, etc.) for the recommended motor control lineup that allow the features identified by the feature engine 116 to work together. The MCC engine 118 may identify control devices based on the input data from the customer as well as historical data from the customer or from similar customers stored in the database(s) 110.

The MCC engine 118 may also determine a recommended layout of the control devices of the motor control lineup. A size (e.g., an overall height, an overall width, and an overall length) of the motor control lineup may be specified by a customer in the input data or may be determined based on the historical data. For example, the MCC engine 118 identifies a size of each control device and determines one or more recommended layouts of the control devices such that the control devices fit within the size of the motor control lineup specified by the customer.

The graphic engine 120 generates a graphical representation of the one or more recommended layouts of the motor control lineup to be rendered on a display of the client device 102. The graphical representation may be formatted to be displayed in a web browser or native application executing on the client device 102. The graphical representation may include each of the control devices identified by the MCC engine 118. In some embodiments, the graphical representation may be an elevation view of the motor control lineup.

The single-line engine 124 may generate a single-line diagram representing the motor control lineup. The single-line diagram may be a visual representation of the electrical system(s) of the industrial automation project 130. The electrical system may be complex and the single-line diagram provides a simplified visual representation of the electrical system in two-dimensions. To generate the single-line diagram, the single-line engine 124 may generate a graphical object for each of the electrical equipment in the electrical load list and each of the control devices in the motor control lineup. The graphical objects may be generated using scalable vector graphics, as discussed in more detail below.

If the input data is updated or modified by the customer, the computing system 108 may dynamically update the recommended motor control lineup and corresponding features, the layout of the motor control lineup, the graphical representation of the layout of the motor control lineup, and the single-line diagram based on the updates/modifications provided by the user. For example, if a new load is added to the electrical load list, the MCC engine 118 may determine that a new control device is to be added to the motor control lineup. The MCC engine 118 may also determine that one or more parameters (e.g., a voltage or current capacity) of one or more of the control devices is to be updated based on the new load. The graphic engine 120 may dynamically update the graphical representation of the motor control lineup to include the new or updated control device. The single-line engine 124 may also generate a new or updated graphical object to be included in the single-line diagram.

Figure 2:
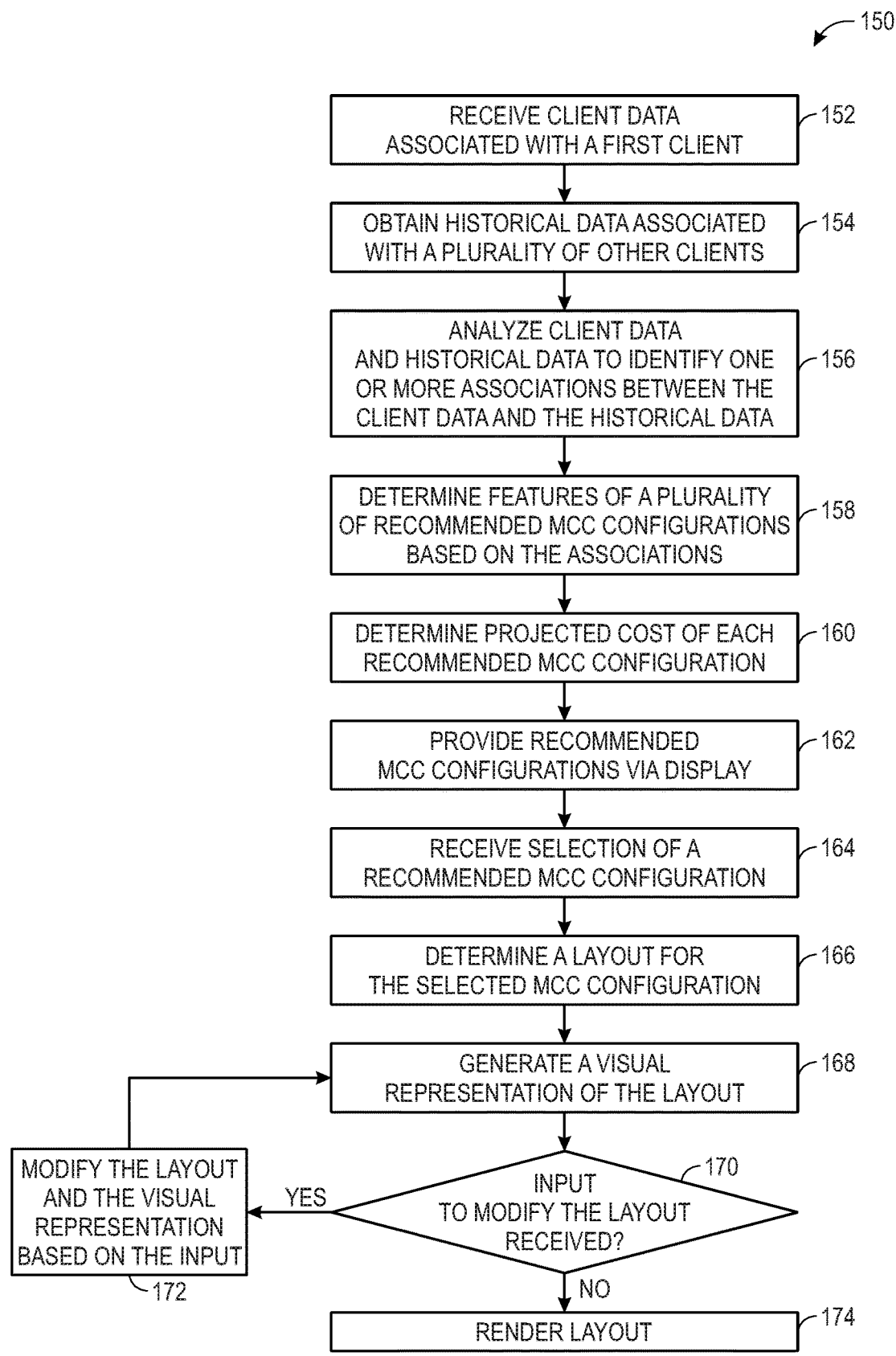
FIG. 2 illustrates a flow chart of a process for generating a motor control lineup, according to an embodiment.

FIG. 2 illustrates a flow chart 150 of a process for generating a recommended motor control lineup based on inputs provided by a customer. The flow chart 150 begins at operation 152 where input data associated with a first client (i.e., the customer) is received. The input data may be obtained directly from the first client (e.g., input via a graphical user interface) or from a database. That is, the input data may represent near real-time (e.g., current as of seconds, minutes, hours, days, etc.) specifications and preferences of the first client.

At operation 154, historical data associated with the customer requesting the design, or a plurality of other customers is obtained. The historical data may be obtained from a database, directly from the customer requesting the design, or directly from one or more of the plurality of other customers. For example, the historical data may be obtained from the database(s) 110 or directly from the monitor system 106 discussed with respect to FIG. 1.

At operation 156, the input data and the historical data are analyzed to identify one or more associations between the input data and the historical data. The one or more associations between the input data and the historical data may be similarities between the input data and historical data. For example, a same or similar geographic location, industry, and/or product/process may be identified between the first client and one or more previous designs for the customer or the plurality of other customers. In such an embodiment, the one or more of the plurality of other customers may be associated with the first client.

If the geographic location of a project provided by the first client is a region within a country, the corresponding country may be the same or similar to that of one or more previous projects from the same customer or the plurality of other customers. That is, the intake engine 114, discussed with respect to FIG. 1, may identify a broader geographic region or country than that provided by the first client. Thus, the number of previous projects having a same or similar geographic location may be increased to widen the scope for possible matches and give a better recommendation for the motor control lineup.

At operation 158, one or more features of the recommended motor control lineups are determined based on the input data and the historical data. Some of the features may be common across each of the one or more recommended motor control lineups. For example, each recommended lineup may include four motor starters and four disconnects. The recommended lineups may differ in features related to safety, such as arc containment, and intelligence, such as remote monitoring and access for remote control and remote reset of control devices.

The features determined at operation 158 may also include various electrical parameters of the motor control lineup including a bus voltage, a frequency, a control voltage, an operating electrical load, and a maximum electrical load. The electrical parameters may be determined based on the input data and the historical data. For example, a bus voltage for the motor control lineup may be determined based on the geographic location provided in the input data and bus voltages of motor control lineups in the same or similar geographic locations found in the historical data.

At operation 160, a projected cost of the recommended motor control lineup is determined. The cost may take into account the various electrical parameters, the control devices, safety features, and any other specifications or parameters requested by the customer. For example, price data for each component and/or service may be stored (e.g., in the database), or retrieved and then summed according to the recommended motor control lineup to determine the projected cost of the system. The projected cost may be provided to the customer in one or more currencies.

At operation 162, the computing system 108 discussed with respect to FIG. 1 may generate one or more graphical objects representing features of the recommended motor control lineups. The recommended motor control lineups may be rendered as a summary or as a list of features included in each lineup via a display of the client device. Some features may be common to each recommended motor control lineup, such as arc containment, while other features may differ between the recommended lineups, such as intelligence options. The recommended motor control lineups are rendered on the display to be presented to the customer. In some embodiments, the recommended motor control lineups may be presented to the customer as elevation views. For example, an elevation view may be a visual representation of a front face of the recommended motor control lineup, as depicted within the graphical user interface illustrated in FIG. 5. If the customer selects (e.g., clicks on) one of the recommended motor control lineups, the computing system may then present an elevation view of the selected motor control lineup to the customer, as discussed in more detail below.

At operation 164, the computing system receives a selection of one of the recommended motor control lineups. For example, if the recommended motor control lineups are presented to the customer in a web browser, the computing system may receive a selection of one of the lineups when the customer clicks on that lineup.

At operation 166, the computing system determines a layout of the selected motor control lineup. The layout may include a position of each control device within the physical motor control lineup. The physical motor control lineup may include one or more vertical sections. Each of the one or more vertical sections may include one or more of the control devices. Each section of the selected lineup may include various control devices having a common power. Thus, the computing system may identify a power common to one or more of the control devices of the selected lineup. For example, one section of the selected motor control lineup may include control devices with a common control voltage of about 24 volts. Another section of the selected lineup may include control devices having a common control voltage of about 12 volts. As another example, one section of the selected motor control lineup may include various control devices having a common bus voltage of about 220 volts.

At operation 168, the computing system generates a visual representation of the layout of the selected motor control lineup. To do so, the computing system may generate one or more graphical objects for each section of the selected motor control lineup. In some embodiments, the computing system may generate a graphical object for each control device. Upon display to the user, the user may provide inputs that modify the proposed layout.

At operation 170, the computing system determines if an input to modify the layout of the selected motor control lineup has been received. If so, the computing system modifies the layout of the motor control lineup based on the received input at operation 172. The computing system then updates the visual representation of the modified layout at operation 168.

If no input to modify the layout is received and/or the user provides affirmative approval of the proposed layout, the computing system renders the visual representation of the selected motor control lineup at operation 174. The visual representation may be rendered at the client device via a web browser or native application executing thereon.

Once rendered, the computing system may continue to monitor for additional input indicating a modification to the MCC layout. If an additional input is received, the layout of the lineup may be modified at operation 172 and the visual representation may be updated based on the additional input at operation 168. The modified visual representation may be rendered at operation 174.

FIG. 3 illustrates a graphical user interface (GUI) 175 for receiving inputs of client data. The GUI 175 may be presented to a customer via a client device, such as the client device 102 discussed with respect to FIG. 1. The GUI 175 may be presented to the customer via a web browser or a native application executing on the client device. As illustrated, the GUI 175 includes a first input portion 180, which includes a number of fields for customer or project specific data. A second input portion 208 is provided for receiving inputs defining an electrical load list.

The first input portion 180 includes data fields for a location 182 of the customer or the industrial automation project 130 and an industry 184 of the customer or the industrial automation project 130. The first input portion 180 also includes data fields for electrical power requirements of the customer or the industrial automation project including a line voltage 192, a frequency 194, an enclosure type 196, a simultaneous load 198, a control voltage 200, a future expansion 202, a horizontal bus rating 204, and an estimated bus size 206.

As shown, one or more data fields on the GUI 175 may include an asterisk (*) 222. The asterisk 222 may indicate a "required" data field which is a minimum required data for the computing system to generate a recommended motor control lineup. Data fields that do not include the asterisk 222 may be optional data fields to be completed by the customer which may improve an accuracy of the computing system to provide a relevant recommendation of a motor control lineup. For example, the line voltage 192 may be input by the customer if known to indicate a voltage of the area or region where the industrial automation project site, and thus the motor control lineup, is or will be located. Similarly, the frequency 194 may indicate a line frequency in the area or region where the motor control lineup will be installed. Data fields that do not include the asterisk 222 may be obtained by the computing system from the electrical load list.

The enclosure type 196 may indicate a minimum enclosure rating for the various control devices in the motor control lineup. The enclosure type 196 may be a customer preference or may be a requirement of a local law or standard for the location or the industry of the industrial automation project 130. The simultaneous load 198 may indicate a percentage of the loads in the load list provided in the second data input portion 208 which may be active at any given time during operation of the motor control lineup.

The control voltage 200 may be a range or average of the control voltages for all control devices in the motor control lineup. The control voltage 200 may also be a maximum control voltage for the motor control lineup. The future expansion 202 may indicate a percentage of the motor control lineup that is to be reserved for potential future expansion for the industrial automation project 130. For example, the future expansion 202 field may indicate a percentage of the volume (e.g., space) of the motor control lineup that is to be left empty for control devices to be added in the future. That is, the customer may estimate a number of control devices to be added to the motor control lineup in the future and reserve a percentage of the motor control lineup for that purpose.

As should be understood that the data fields shown in the GUI 175 are merely examples and many other data types of data may be requested to be input by the customer. Further, data input into the data fields of the first input portion 180, such as the line voltage 192, the frequency 194, the horizontal bus rating 204, and the estimated bus size 206 may be used by the computing system as baseline values. However, the computing system may determine that a different value is needed for these data fields based on the electrical load list.

The second input portion 208 for the electrical load list may include a list of all expected electrical loads in the industrial automation project 130. That is, the load list is a collection of all expected loads to be connected to one or more power supplies, such as generators. The second input portion 208 may include one or more columns representing various electrical parameters of each load. As illustrated, the electrical load list in the second input portion 208 includes a line item number 210 for each load. Data for each load may include a power 212, a full load amp (i.e., electrical current) rating 214, a type or application 216 of the load, and a corresponding motor name 218.

It should be understood that the electrical load list may include any number of electrical parameters specific to all or some of the electrical loads. For example, the electrical load list may include electrical parameters for each load such as a nominal rating, a power factor, an efficiency, a consumed load, a load factor, and the like. It should also be noted that the layout of GUI may be changed without changing a scope or function of the embodiments described herein. For example, a position of the first input portion 180 the second input portion 208 may be interchanged, or otherwise positioned differently than shown in FIG. 3.

FIG. 4 illustrates the graphical user interface 175 depicting a screen for receiving selection of features of a motor control lineup. As shown, the first input portion 180 is similar to that illustrated in FIG. 3. However, a third input portion 230 depicts one or more recommended motor control lineups 232, 242, 244. Each recommended motor control lineup 232, 242, 244 may include a title 234, a list of one or more features 236, and an estimated cost 238. The title 234 and the list of features 236 may be generated by the computing system based on the input data provided by the customer.

The list of features 236 may be common to each recommended motor control lineup 232, 242, 244, facilitating ease of comparison between the recommended motor control lineups 232, 242, 244. Each individual feature of the list of features 236 may be identified as included or not included in a particular recommended motor control lineup by a visual object presented in the GUI 175. For example, the feature of intelligent software is not included in the recommended motor control lineups 232 and 244, as indicated by an 'X' next to the intelligent software feature. However, the intelligent software is included in the recommended motor control lineup 242 as indicated by a checkmark next to the intelligent software feature. Some features 236 of the list may be common to each recommended motor control lineup 232, 242, 244. For example, each recommended motor control lineup 232, 242, 244 includes a power monitor and an insulated bus, as indicated by the checkmarks shown in each recommended motor control lineup 232, 242, 244.

In some embodiments, each recommended motor control lineup 232, 242, 244 includes a safety indicator and an intelligence indicator. The safety and intelligence indicators provide a fast and efficient visual comparison for each recommended motor control lineup. As shown, the safety and intelligence indicators of the recommended motor control lineup 242 indicate an increased intelligence level while the safety and intelligence indicators of the recommended motor control lineup 244 indicate an increased safety level, in accordance with the titles 234.

Each recommended motor control lineup 232, 242, 244 also includes a visual object 240 that the customer can click on or otherwise choose to indicate a preference of the respective motor control lineup 232, 242, 244. As shown, each motor control lineup 232, 242, 244 includes a "Select" visual object 240 that can be selected by the customer.

In some embodiments, the customer may interact with the third input portion 230 to select one or more features in the list of features 236 that are indicated as not included in a particular recommended motor control lineup. For example, the customer may be able to select a "Safety Rating" feature in the recommended motor control lineup 242. The feature may be selected by clicking on the feature or the corresponding inclusion indicator (e.g., the check mark or 'X').

Based on this user input, the system may check to determine whether there is an existing motor control lineup having the specified combination of features, and if not, attempt to create a custom motor control lineup having the specified combination of features. The system may then update the third input portion 230 based on the user feedback to include the motor control lineup having the specified combination of features. In some embodiments, all of the motor control lineup options in the third input portion 230 of the GUI 175 may be updated based on the user feedback. For example, the third input portion 230 of the GUI 175 may update to display a selection of motor control lineup options that all include and/or omit the features toggled by the user according to the user's inputs.

Figure 5:
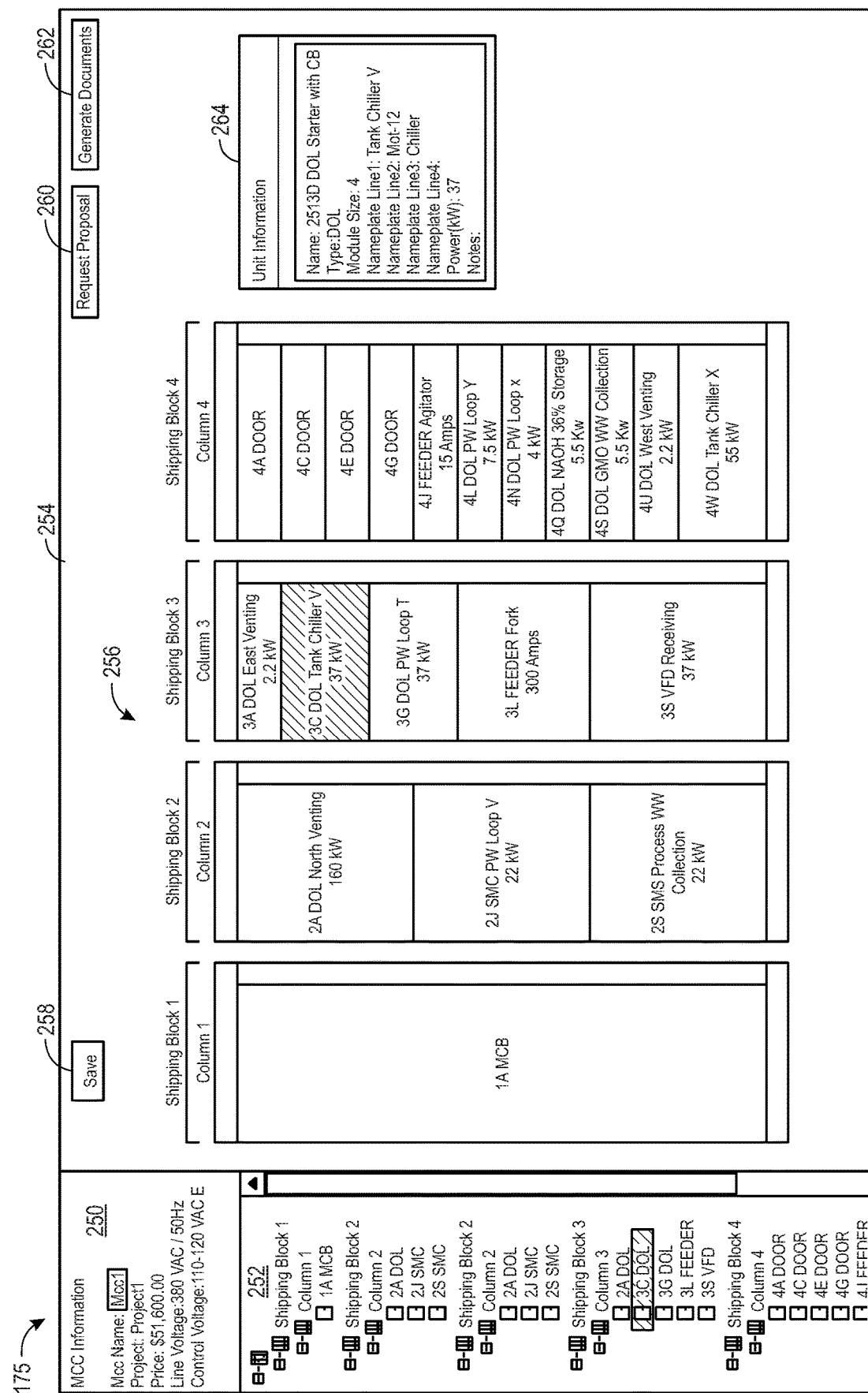
FIG. 5 illustrates a graphical user interface for determining a layout of the motor control lineup of FIGS. 3 and 4, according to one embodiment.

FIG. 5 illustrates the GUI 175 for reviewing a proposed layout of an MCC, according to one embodiment. Once the customer chooses features for the motor control lineup as discussed above, the computing system may generate a graphical representation of the chosen lineup and render that representation in a fourth portion 254 of the GUI 175. A fifth portion 250 of the GUI 175 may include general information regarding the motor control lineup and a corresponding industrial automation project 130. A sixth portion 252 of the GUI 175 may include a nested or collapsible/expandable line item view of the motor control lineup.

As shown, the graphical representation of the chosen motor control lineup depicted as a motor control center (MCC) lineup may be an elevation view 256. The elevation view 256 may include one or more sections or columns of the motor control lineup. The sections of the motor control lineup may be a visual representation of how the motor control lineup will be shipped to the customer or to the industrial automation project site. The elevation view 256 may include a block representing at least each control device included in the electrical load list, discussed above.

The elevation view 256 may be interactive such that the customer can click on and drag the individual blocks of the motor control lineup to different locations within the corresponding column or a different column. For example, the customer may click on the second block in "Column 3." When a block is selected, that block may be highlighted, as shown. A corresponding line item in the collapsible line item view in the sixth portion 252 may also be highlighted, as shown. Further, an information block 264 may be rendered in the GUI 175 showing specific data related to the selected block.

Once the block is selected, the customer may be able to drag the selected block higher or lower in "Column 3" of the elevation view 256 or to a location in a different column. Once the block is moved, the computing system may re-determine a layout of the motor control lineup and render an updated elevation view 256 including the changes. For example, if the selected block is moved to a column having blocks of sizes different than a size of the selected block, one or more other blocks may be moved fill the vacant space left by the selected block as well as ensure sufficient space in the column with the new location of the selected block.

The GUI 175 may also include various functional buttons that can be used during design of the motor control lineup or after a final layout is determined. For example, a first button 258 may be used to save any changes made to the motor control lineup. A second button 260 may generate and submit a request for proposal to the manufacturer of the motor control lineup. A third button 262 may generate one or more documents related to the motor control lineup. For example, the documents related to the motor control lineup may include a request for proposal, a request for quotation, a corresponding single-line diagram, a formal elevation view, and the like. Each of the one or more documents may be generated in any format, including a text document, a portable document format (PDF), an image, or the like.

Figure 6:
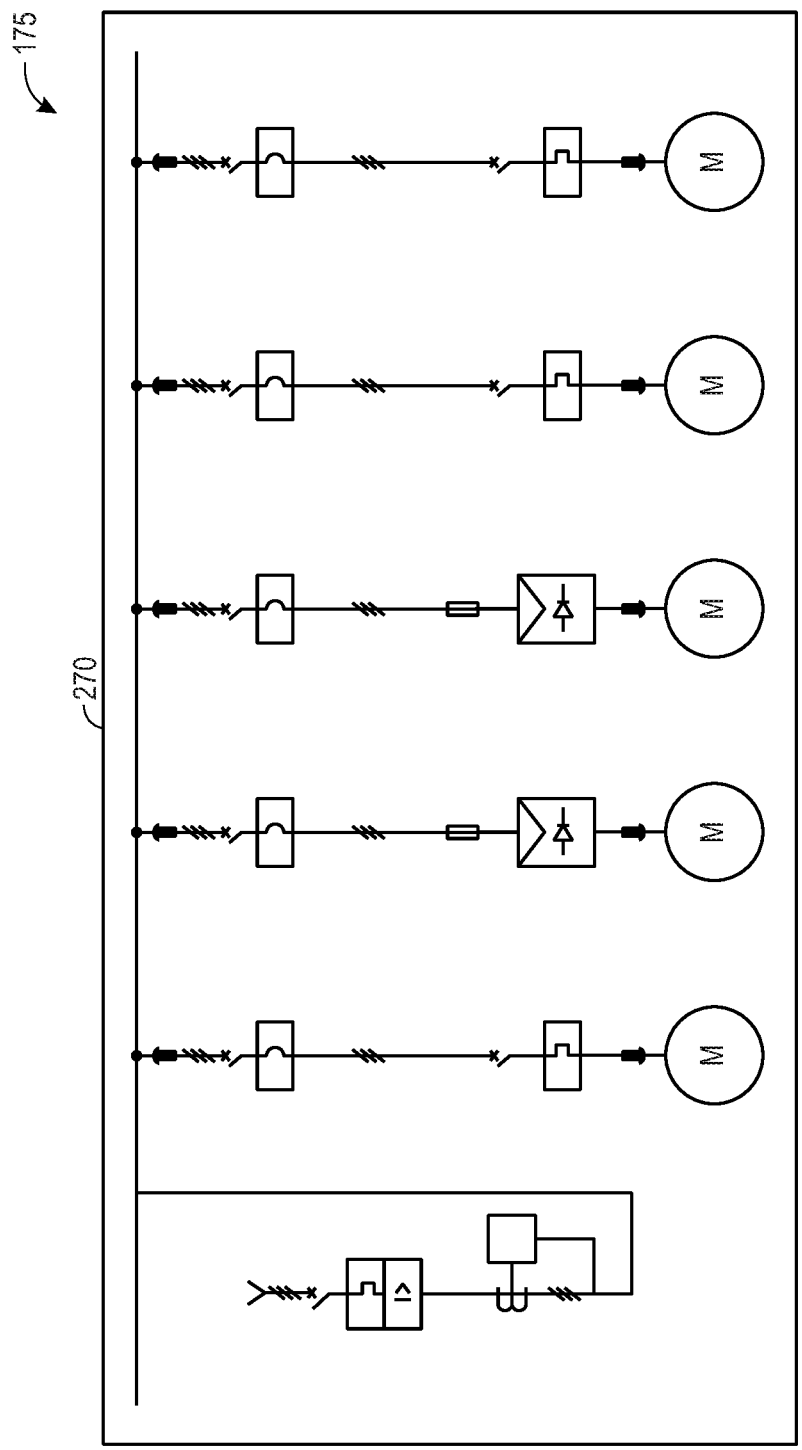
FIG. 6 illustrates a single-line diagram dynamically generated by the system shown in FIG. 1, according to one embodiment.

FIG. 6 illustrates a single-line diagram 270 generated by the system and displayed in the graphical user interface 175, according to one embodiment. The single-line diagram 270 provides a visual representation of the electrical systems of the industrial automation project 130, including the control devices of the motor control lineup. The single-line diagram 270 may be dynamically generated by the computing system at any time during the MCC recommendation process described herein. For example, the single-line diagram may be generated when the customer inputs data including an electrical load list into the GUI 175, as discussed above. As any changes are made to the input data or preferences of the customer, the computing system may update the single-line diagram to reflect those changes. Thus, the single-line diagram is a visual representation of the motor control lineup as modified by the customer.

Single-line diagrams are typically manually generated by a user using a computer-aided design (CAD) program or some other suitable tool. That is, the user may receive information related to an electrical power system, such as an electrical load list and generate a single-line diagram representative of the electrical power system. This process to generate a single-line diagram may be resource intensive and time consuming. Further, any changes or corrections made to the single-line diagram adds to the process and increases the amount of time used to generate the diagram. Thus, the embodiments described herein provide techniques to dynamically generate a single-line diagram for viewing in real-time during a design phase of an industrial automation project as the electrical load items or customer preferences are changed or added to the design in real-time. The single-line diagram may be dynamically modified while the electrical load list is generated, modified, or the like.

To generate the single-line diagram 270, the computing system may receive an input representative of one or more electrical components from the load list. The load list may be fully or partially completed. As the computing system receives each input of the load list, the computing system may identify a graphical object representative of a corresponding component in the load list. Before generating the graphical objects, the computing system may identify a web browser or application used by the customer. The computing system may generate the graphical objects in a format that is compatible with the web browser or native application employed by the customer.

After a particular the graphical object is generated, the computing system may dynamically add that graphical object to a single-line diagram presented via the web browser or native application used by the customer. Thus, the single-line diagram presents a real-time visual representation of the electrical equipment that are part of the load list at any given time. Further, as changes are made to the electrical load list, the computing system may dynamically update the graphical objects, such that the single-line diagram is updated to reflect the changes as the changes are made. That is, the computing system dynamically generates and updates the single-line diagram to reflect a current state of the electrical load list.

Connections between the graphical objects of the single-line diagram may be generated while the graphical objects corresponding to the components of the load list are generated. In some embodiments, the connections may be generated after all current graphical objects are generated and rendered in the single-line diagram. Thus, in some embodiments, generating and rendering the connections between components of the single-line diagram may be performed concurrently with generating and rendering the graphical objects representing the components of the load list. In other embodiments, generating and rendering the connections may be performed as separate operations from generating and rendering the graphical objects corresponding to the components of the load list, respectively. The connections between components may be generated as part of the graphical objects representing the component of the load list or as additional graphical objects.

In some embodiments, the load list is generated by the customer directly on the server using a web-based application. In that case, the computing system may continually analyze the load list and generate a graphics object for each electrical component thereof. As the graphics objects are generated, the computing system may update the single-line diagram presented on the display. That is, as additional pieces of electrical equipment are added to the load list, the single-line diagram is updated by the computing system. Thus, a current view of the single-line diagram in the web browser or application corresponds to the current electrical load list.

Moreover, the current view of the single-line diagram may be distributed to a number of computing systems communicatively coupled to the computing system receiving the input. With this in mind, in some embodiments, the customer may provide the load list remotely via a network to supervisors, subordinates, clients, customers, vendors, suppliers, contractors, etc. As such, a server computing system may receive and analyze the load list to identify various electrical equipment that are part of the load list. The server computing system may generate a graphical object for each electrical equipment in the load list.

In some embodiments, the server computing system may generate the graphical objects as scalable vector graphics (SVG). In other embodiments, the format of the graphical objects (and the single-line diagram) is a format other than SVG, such as encapsulated postscript (EPS), portable document format (PDF), or raster graphics. In any case, the server computing system or any other suitable computing system may dynamically convert the input data representative of the load list items into graphical objects interpretable by the computing system intended to receive the single-line diagram visualization.

In some embodiments, the server computing system may convert the input data from JSON data to SVG data as the input data is received, such that the server computing system may send the SVG data to the computing device, which may generate the single-line diagram visualization based on the SVG data. In some embodiments, the input data, the single-line diagram, or the graphical object data may also be used to generate an elevation view that represents how components that are part of the single-line diagram may be positioned within an enclosure or a collection of enclosures.

Figure 7:
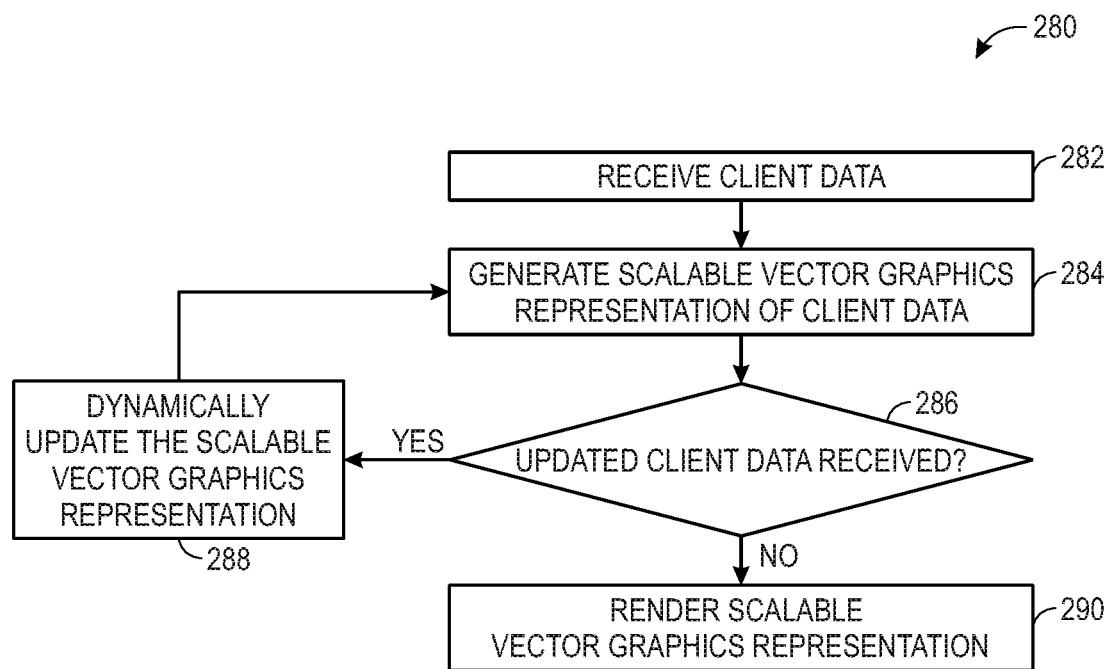
FIG. 7 illustrates a flow chart of a process for dynamically generating the single-line diagram shown in FIG. 6, according to one embodiment.

FIG. 7 illustrates a flow chart 280 of a process for dynamically generating a single-line diagram, according to one embodiment. The flow chart 280 begins at operation 282 where input data is received (e.g., via the GUI). The input data may include an electrical load list and any other relevant customer data including preferences or specifications. The electrical load list may include, for example, generators, motors, corresponding control devices, and the like. The input data may be provided by the customer via a graphical user interface (GUI) such as that described above with respect to FIGS. 3-5.

At operation 284, the computing system generates a graphical object representative of each item in the electrical load list. The graphical object may be generated by applying a set of rules to the items in the electrical load list. For example, the computing system may generate a scalable vector graphics (SVG) object for each item in the load list at a current time. The computing system may determine a layout of the SVG objects based on the input data in the electrical load list and the recommend motor control lineup. For example, the computing system may determine what SVG objects of the single-line diagram are to be connected to each other and in what order along a given load line. The computing system may utilize historical data from the customer or the additional customers to determine connections between the SVG objects and an order of the SVG objects in the single-line diagram.

Once the single-line diagram is generated, the graphical objects may be stored in one or more databases, such as the databases 110 discussed with respect to FIG. 1. Further, the graphical objects and the single-line diagram may be stored and used to train a machine learning model. For example, the machine learning model may include historical single-line diagrams (including corrections or changes made to the single-line diagram by an associated customer) and corresponding motor control lineups to ensure the most recent customer data is taken into account. Further, the machine learning model may improve an accuracy of the single-line diagram by using the most recent customer data.

At operation 286, the computing system determines if updated input data has been received. For example, the computing system may identify a modification to the previously received input data or new input data.

If updated input data is received, the computing system may modify one or more of the scalable vector graphics objects or generate one or more new scalable vector graphics objects as needed, at operation 288. If the computing system does not detect updated input data, the scalable vector graphics representation of the electrical load list is rendered to be presented to the customer at operation 290. That is, the computing system renders each scalable vector graphics object in the form of the single-line diagram.

In summary, the present disclosure relates to dynamically generating one or more recommended motor control lineups and generating a single-line diagram from an electrical load list. Regarding the recommended motor control lineup, the computing system analyzes organization data related to the organization associated with a user and other organizations with similar attributes, such as industry and geographic location. The organization data may be received via a web browser or retrieved from a database. The recommended motor control lineup is presented to the customer via a GUI (displayed in a native application or a web browser) in an elevation view where the user can modify the lineup as desired.

The single-line diagram may provide a visual representation of the motor control lineup and can be generated from the motor control lineup, as modified by the user. After the electrical load list is received, a graphics engine identifies each electrical component in the load list and generates a corresponding graphical object. As each graphical object is generated, the graphics engine updates the single-line diagram, which is concurrently rendered in the web browser. Advantageously, embodiments described herein provide a real-time rendering of the single-line diagram which is updated throughout a lifecycle of a project. Further, embodiments described herein improve an efficiency of generating a single-line diagram because individual graphical objects can be updated without having to manually revise the single-line diagram.

The techniques disclosed herein improves accuracy of the motor control lineup recommended to the user by integrating data into the analysis which may not be directly related to the customer. Further, techniques described herein reduce an amount of computing resources needed to generate the recommended motor control lineup. Embodiments described herein also provide a real-time rendering of the single-line diagram which is updated throughout a lifecycle of a project. Further, embodiments described herein improve an efficiency of generating a single-line diagram because individual graphical objects can be updated without having to manually revise the single-line diagram.

Advantageously, embodiments disclosed herein provide techniques to reduce a time required to design, re-design, and prepare an order for industrial device assemblies and a corresponding single-line diagram. Thus, the embodiments disclosed herein reduce project delays and provide a streamlined process for the design and ordering process of industrial device assemblies.

While only certain features of the disclosure have been illustrated and described herein, many modifications and changes will occur to those skilled in the art. It is, therefore, to be understood that the appended claims are intended to cover all such modifications and changes as fall within the scope of the disclosure.

The invention claimed is:

1. A method, comprising:
receiving client data associated with a first industrial automation project, wherein the client data defines one or more characteristics of a design of the first industrial automation project;
parsing historical data related to motor control lineups of a plurality of previous industrial automation projects;
identifying at least one previous industrial automation project of the plurality of previous industrial automation projects that corresponds to the first industrial automation project based on a comparison of the client data and the historical data related to motor control lineups of the plurality of previous industrial automation projects;
generating a motor control lineup based on the client data and the at least one previous industrial automation project that corresponds to the first industrial automation project;
generating a visual representation of the motor control lineup;
presenting the visual representation for display via a graphical user interface (GUI); receiving, via the GUI, one or more inputs modifying the motor control lineup; and
modifying the motor control lineup and the visual representation based on the one or more inputs.

2. The method of claim 1, wherein the motor control lineup comprises a plurality of motor control lineup options.

3. The method of claim 1, wherein the client data comprises a motor load list, a geographic location of the first industrial automation project, and an industry of the first industrial automation project.

4. The method of claim 3, wherein the motor load list comprises a plurality of industrial control devices.

5. The method of claim 4, wherein generating the visual representation of the motor control lineup comprises generating a graphical object for each control device of the plurality of industrial control devices.

6. The method of claim 3, wherein the industry of the first industrial automation project indicates a line voltage and a control voltage of the first industrial automation project corresponding to the motor load list.

7. The method of claim 6, wherein client data is associated with a first client and wherein the at least one previous industrial automation project is associated with a different client.

8. A system for generating a motor control lineup comprising: a processor; and
a memory storing instructions that, when executed by the processor, cause the processor to perform operations comprising:
receiving client data from a first client defining one or more electrical loads of an industrial automation project;
parsing historical data related to motor control lineups of a plurality of previous industrial automation projects for a plurality of additional clients;
identifying at least one additional client of the plurality of additional clients having one or more similarities to the first client based on the client data and the historical data;
generating a plurality of motor control lineups based on the one or more similarities between the first client and the at least one additional client;
transmitting a summary of the plurality of motor control lineups for display via a graphical user interface (GUI);
receiving, via the GUI, a selection of a first motor control lineup of the plurality of motor control lineups;
generating a visual representation of the selected motor control lineup including a graphical object corresponding to each of the one or more electrical loads; and
presenting the visual representation of the selected motor control lineup for display on the GUI.

9. The system of claim 8, wherein each motor control lineup of the plurality of motor control lineups comprises one or more features related to automation of an operation of the motor control lineup.

10. The system of claim 9, wherein at least two motor control lineups of the plurality of motor control lineups include common features.

11. The system of claim 8, wherein the visual representation of the selected motor control lineup is modified based on one or more inputs received via the GUI.

12. The system of claim 8, wherein the visual representation of the selected motor control lineup is an elevation view of the selected motor control lineup.

13. The system of claim 8, wherein the operations comprise:
generating one or more documents related to the selected motor control lineup.

14. The system of claim 13, wherein the one or more documents comprise a single-line diagram, a request for quotation, a purchase order, or a combination thereof.

15. A non-transitory computer readable medium storing instructions that, when executed by a processor, cause the processor to perform operations comprising:
receiving client data from a first client related to one or more electrical loads of a first industrial automation project, wherein the client data comprises a location and an industry of the first industrial automation project;
parsing historical data related to motor control lineups of a plurality of previous industrial automation projects;
identifying at least one previous industrial automation project of the plurality of previous industrial automation projects that corresponds to the first industrial automation project based on the client data and the historical data related to motor control lineups of the plurality of previous industrial automation projects;

generating a motor control lineup based on the client data and the at least one previous industrial automation project that corresponds to the first industrial automation project;

generating a visual representation of the motor control lineup including a graphical object corresponding to each of the one or more electrical loads; and presenting the visual representation of the motor control lineup for display via a graphical user interface (GUI).

16. The non-transitory computer readable medium of claim 15, wherein a location of the at least one previous industrial automation project is the same as the location of the first industrial automation project.

17. The non-transitory computer readable medium of claim 16, wherein an industry of the at least one previous industrial automation project is different than the industry of the first industrial automation project.

18. The non-transitory computer readable medium of claim 15, wherein an industry of the at least one previous industrial automation project of the plurality of previous industrial automation projects is the same as the industry of the first industrial automation project.

19. The non-transitory computer readable medium of claim 17, wherein a location of the at least one previous industrial automation project of the plurality of previous industrial automation projects is different than the location of the first industrial automation project.

20. The non-transitory computer readable medium of claim 15, the operations comprising:

generating a single-line diagram representative of the motor control lineup based on the visual representation of the motor control lineup.

\* \* \* \* \*